United States Patent [19]

Mastenbroek et al.

[11] Patent Number: 5,115,094
[45] Date of Patent: May 19, 1992

[54] POLYMERIZATION OF CO/OLEFIN WITH MOLAR RATIO OF NON HYDROHALOGENIC ACID TO PALLADIUM COMPOUND

[75] Inventors: Barend Mastenbroek; Leonardus Petrus, both of Amsterdam, Netherlands

[73] Assignee: Shell Oil Company, Houston, Tex.

[21] Appl. No.: 612,372

[22] Filed: Nov. 14, 1990

[30] Foreign Application Priority Data

Jan. 30, 1990 [NL] Netherlands .................... 9000220

[51] Int. Cl.$^5$ ............................................. C08G 67/02
[52] U.S. Cl. ............................................. 528/392
[58] Field of Search .................................. 528/392

[56] References Cited

U.S. PATENT DOCUMENTS

| | | | |
|---|---|---|---|
| 3,694,412 | 9/1972 | Nozakai | 260/63 |
| 4,804,739 | 2/1989 | Drent | 528/392 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,880,903 | 11/1989 | Van Broekhoven et al. | 528/392 |
| 4,914,184 | 4/1990 | Rosenbrand et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 5/1987 | European Pat. Off. . |
| 254343 | 1/1988 | European Pat. Off. . |
| 339744 | 4/1989 | European Pat. Off. . |

*Primary Examiner*—Harold D. Anderson

[57] ABSTRACT

An improved process for the production of linear alternating polymers of carbon monoxide and at least one ethylenically unsaturated hydrocarbon comprises the continuous process wherein the carbon monoxide and ethylenically unsaturated hydrocarbon are contacted under polymerization conditions in the presence of a catalyst composition formed from a compound of palladium, a non-hydrohalogenic acid and a bidentate ligand of phosphorus, the molar ratio of the acid to palladium being below 6.

7 Claims, No Drawings

POLYMERIZATION OF CO/OLEFIN WITH MOLAR RATIO OF NON HYDROHALOGENIC ACID TO PALLADIUM COMPOUND

FIELD OF THE INVENTION

This invention relates to an improved process for the production of linear alternating polymers of carbon monoxide and at least one ethylenically unsaturated hydrocarbon. More particularly, the invention relates to an improved continuous process for the production of such polymers wherein two of the catalyst composition components are present in a specified ratio.

BACKGROUND OF THE INVENTION

The class of linear alternating polymers of carbon monoxide and at least one ethylenically unsaturated hydrocarbon is known in the art. An early disclosure of such polymers was by Nozaki, e.g., U.S. Pat. No. 3,694,412. The more recent processes for the production of such linear alternating polymers is illustrated by a number of published European Patent applications including 121,965, 181,014, 213,671 and 257,663. These processes typically involve the use of a catalyst compound formed from a compound of palladium, a strong non-hydrohalogenic acid and a bidentate ligand of phosphorus or nitrogen, particularly phosphorus. The resulting polymers, now known as polyketones or polyketone polymers, are relatively high molecular weight materials having established utility as thermoplastic polymers. The polyketones are processed by methods conventional for thermoplastics, e.g., extrusion, injection molding and thermoforming, into a variety of useful shaped articles such as containers for food and drink.

In the production of the linear alternating polymers, the polymerization rate and also the molecular weight of the polymer are important considerations. It would be advantageous to produce polymer at a high polymerization rate. It is also of importance to produce a linear alternating polymer of a relatively high molecular weight because of the particularly useful properties of such products. The polymerization rate and product molecular weight are both influenced by reaction temperature but an increase in reaction temperature which results in a more rapid polymerization rate will generally result in a lower molecular weight. As a result of this inverse relationship, it is often necessary to choose a reaction rate which will produce product of the desired molecular weight and accept whatever polymerization rate results.

When the polymerization process is conducted in a batch type process, the ratio of non-hydrohalogenic acid to palladium is also important. In batchwise operation, it has been found that increases in product molecular weight and also reaction rate are obtained at a given temperature as the molar ratio of the non-hydrohalogenic acid to the palladium is increased up to a value of about 10. Molar ratios below 10 and in some cases below 6 are known, for example, from published European Patent Applications 339,744 and 213,671, but in batchwise operations and provide inferior results. It is on some occasions desirable to conduct the polymerization process in a continuous manner in one reactor or several reactors in series. In a continuous process the reaction conditions are substantially constant and the process is easier to control. A continuous process which employs a molar ratio of non-hydrohalogenic acid to palladium as high as 10 does, however, have some disadvantages. The presence of non-hydrohalogenic acid in the polymer product can lead to discoloration and/or decomposition. While the acid in the polyketone product can be removed or at least reduced in quantity as by water washing, such reduction of acid does require additional process steps. It would be of advantage to provide an improved continuous-type polymerization process which employs a lower acid/palladium molar ratio.

SUMMARY OF THE INVENTION

The present invention provides an improved continuous process for the production of linear alternating polymers of carbon monoxide and at least one ethylenically unsaturated hydrocarbon. More particularly, the invention provides such an improved continuous process employing a catalyst composition wherein the molar ratio of several of the catalyst composition components is controlled.

DISCUSSION OF THE INVENTION

The present invention is an improved continuous process for the production of linear alternating polymer of carbon monoxide and at least one ethylenically unsaturated hydrocarbon which employs a catalyst composition formed from a compound of palladium, a strong non-hydrohalogenic acid and a bidentate ligand of phosphorous. In the process of the invention, the molar ratio of non-hydrohalogenic acid to palladium is below 6.

The polymers which are produced according to the improved process of the invention are linear alternating polymers of carbon monoxide and at least one ethylenically unsaturated hydrocarbon. The ethylenically unsaturated hydrocarbons which are useful as precursors of the linear alternating polymers have up to 20 carbon atoms, preferably up to 10 carbon atoms, and are aliphatic including α-olefins such as ethylene, propylene, 1-butene, isobutylene, 1-hexene, 1-octene and 1-dodecene, or are arylaliphatic containing an aryl substituent on an otherwise aliphatic molecule, preferably an aryl substituent on a carbon atom of the ethylenic unsaturation. Examples of this latter class of ethylenically unsaturated hydrocarbons are styrene, p-methylstyrene, p-ethylstyrene and m-isopropylstyrene. The preferred polyketone polymers are copolymers of carbon monoxide and ethylene and terpolymers of carbon monoxide, ethylene and a second ethylenically unsaturated hydrocarbon of at least 3 carbon atoms, particularly an α-olefin such as propylene.

When the preferred terpolymers are produced, there will be at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

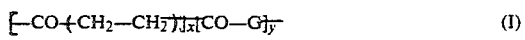 (I)

wherein G is the moiety of an ethylenically unsaturated hydrocarbon of at least 3 carbon atoms polymerized through the ethylenic unsaturation thereof and the ratio of y:x is no more than about 0.5. When the preferred copolymers of carbon monoxide and ethylene are provided there will be no second hydrocarbon present and the copolymers are represented by the above formula I wherein y is zero. When y is other than zero, i.e., terpolymers are produced, the —CO$+$CH$_2$CH$_2+$ units and the —CO$+$G$+$ units are found randomly throughout the polymer chain and the ratio of y:x is preferably from about 0.01 to about 0.1. The end groups or "caps" of the polymer chain will depend on what materials were present during polymerization and whether and how the polymer has been purified. The end groups are of little significance so far as the overall properties of the polymer are concerned so that the polymers are fairly depicted by the formula for the polymer chain as depicted above.

Of particular interest are the polyketone polymers of number average molecular weight from about 1000 to about 200,000, particularly those polymers of number average molecular weight from about 20,000 to about 90,000, as determined by gel permeation chromatography. The physical properties of the polymer will depend in part upon the molecular weight, whether the polymer is a terpolymer or a copolymer and, in the case of terpolymers, the nature of and the proportion of the second hydrocarbon present. Typical melting points for such polymers are from about 175° C. to about 300° C., preferably from about 210° C. to about 270° C. The polymers will have a limiting viscosity number (LVN), as measured in a standard capillary viscosity measuring device in m-cresol at 60° C., of from about 0.4 dl/g to about 10 dl/g, preferably from about 0.8 dl/g to about 4 dl/g.

The polymers are produced in a continuous process by methods which are broadly conventional. The reactants are charged along with a reaction diluent to a suitable reaction zone where they contact the catalyst composition. As reaction proceeds under polymerization conditions, additional monomer feed, diluent and catalyst composition are introduced to the reactor and product is continuously withdrawn after an initial period of polymerization. The reaction zone comprises a single reactor or alternatively two or more reactors designed to operate in series. When the reaction zone comprises reactors operating in series, it may be necessary to vent or remove a portion of unreacted gaseous feed to maintain a relatively constant reaction temperature and pressure throughout the reaction zone.

The reaction diluent is suitably an alkanol such as methanol or ethanol and methanol is preferred. The reaction temperature is in the range of from about 25° C. to about 150° C. and is preferably from about 30° C. to about 130° C. The reaction pressure is from about 2 bar to about 100 bar but more often is from about 5 bar to about 100 bar. In the monomer feed to at least the initial reactor, the molar ratio of total unsaturated hydrocarbon to carbon monoxide is from about 10:1 to about 1:10, preferably from about 5:1 to about 1:5.

The catalyst composition employed in the improved process of the invention is formed from a compound of palladium, a specified proportion, relative to the palladium, of a strong non-hydrohalogenic acid and a bidentate ligand of phosphorus. The compound of palladium is preferably a palladium alkanoate and palladium compounds such as palladium acetate, palladium propionate, palladium hexanoate and palladium octanoate are satisfactory. Palladium acetate is particularly preferred.

The non-hydrohalogenic acid employed in the formation of the polymerization catalyst is preferably a non-hydrohalogenic acid having a pKa, as measured in water at 18° C., below 2. Such acids include inorganic acids such as sulfuric acid and perchloric acid and also organic acids, including carboxylic acids such as trichloroacetic acid, dichloroacetic acid, and trifluoroacetic acid, and sulfonic acids such as p-toluenesulfonic acid and methanesulfonic acid. Particularly preferred as the non-hydrohalogenic acid is trifluoroacetic acid. Although catalyst compositions formed from broad molar ratios of the acid and the palladium compound are useful in the production of linear alternating polymers, in order to obtain the benefits of the continuous process of the invention the molar ratio of the acid to palladium should be below 6, for example, from about 0.5 mole to about 5 moles of non-hydrohalogenic acid per mole of palladium. Preferably the molar ratio of non-hydrohalogenic acid to the palladium will be from about 1 to about 4.

The bidentate ligand of phosphorus employed as a catalyst composition component of the present invention is suitably a tetraaryl bisphosphine such as those represented by the formula

wherein R independently is aryl of up to 10 carbon atoms inclusive and R' is a divalent hydrocarbyl bridging group of up to 10 carbon atoms with from 2 to 3 carbon atoms in the bridge. The R groups are hydrocarbyl containing only atoms of carbon and hydrogen, e.g., phenyl, naphthyl, p-methylphenyl or m-ethylphenyl, or are substituted hydrocarbyl containing additional atoms such as divalent oxygen. The preferred substituted hydrocarbon groups having polar substituents, preferably alkoxy substituents, at least one of which is located on an aromatic ring carbon atom ortho to the aromatic ring carbon atom through which the R group is attached to the phosphorus. Suitable substituted hydrocarbon groups include o-methoxyphenyl, o-ethoxyphenyl, 2,4-dimethoxyphenyl and 2,6-di-n-propoxyphenyl. The preferred R' groups are those wherein the bridge carbon atoms are substituted only with hydrogen atoms, e.g., 1,2-ethylene and 1,3-propylene. The preferred bidentate phosphine ligands are 1,3-bis(diphenylphosphino)-propane and 1,3-bis[di(2-methoxyphenyl)phosphino]propane. The bidentate ligand is provided in a quantity of from about 0.5 mole to about 2 moles per mole of palladium, preferably from about 0.75 mole to about 1.5 mole per mole of palladium.

The process of the invention therefore takes place as a continuous process wherein the monomeric reactants are contacted under polymerization conditions in the presence of the catalyst composition wherein the molar ratio of the non-hydrohalogenic acid to the palladium is below 6. Sufficient catalyst composition is employed in the continuous process of the invention to provide from about $1 \times 10^{-7}$ mole to about $1 \times 10^{-3}$ mole of palladium per mole of total ethylenically unsaturated hydrocarbon. Preferably, a quantity of catalyst composition is used which will provide from about $1 \times 10^{-6}$ mole to about $1 \times 10^{-4}$ mole of palladium per mole of total unsaturated hydrocarbon. The polyketone product is substantially insoluble in the medium of its production and is observed as a suspension in the reactor mixture. It is removed as formed from the reaction zone and recovered if necessary from the reaction diluent by conventional procedures such as filtration or decantation. The polymer product is used as obtained or may be purified as by contact with a solvent or a complexing agent selective for catalyst residues.

The improved continuous process of the invention offers the advantage of efficient operation at relatively low molar ratios of the non-hydrohalogenic acid to palladium and thereby avoids the product decomposition/discoloration often encountered when higher ratios are used. Unlike batchwise operation, however, the use of molar ratios of acid to palladium below 6 does not result in a decrease of average molecular weight of the product, as reflected in a relatively constant limiting viscosity number. Moreover, use of molar ratios of acid to palladium below 6 results in an increase in reaction rate.

The polyketone polymer product is a thermoplastic and is processed by well known methods, e.g., injection molding, thermoforming and extrusion, into a variety of objects such as films, fibers, wire and cables and other shaped articles of established utility. Specific applications include containers for food and drink and parts and housings for automotive applications.

The invention is further illustrated by the following Comparative Examples (not of the invention) and the following Illustrative Embodiments which should not be regarded as limiting. Each polymer product was examined by $^{13}C$-NMR analysis and found to be linear with alternating units derived from carbon monoxide and from ethylene in the case of copolymers and, in the case of terpolymers, alternating units from carbon monoxide and from ethylene or propylene. All limiting viscosity values were determined at 60° C. in m-cresol.

COMPARATIVE EXAMPLE I

A copolymer of carbon monoxide and ethylene was produced by charging 200 ml of methanol to an autoclave of 300 ml capacity equipped with a mechanical stirrer. After the autoclave and contents were warmed to 90° C., ethylene and carbon monoxide were introduced until the ethylene partial pressure reached 33 bar and the carbon monoxide partial pressure reached 27 bar. A catalyst compostion solution was then added which comprised 23.5 ml methanol, 1.5 ml toluene, 0.01 mmol palladium acetate, 0.02 mmol trifluoroacetic acid and 0.01 mmol 1,3-bis[di(2-methoxyphenyl)phosphino]propane.

The pressure in the autoclave was maintained relatively constant by continuing addition of an equimolar mixture of carbon monoxide and ethylene. After 3 hours, the polymerization was terminated by cooling the autoclave and contents to room temperature and releasing the pressure. The copolymer was recovered by filtration, washed with methanol and dried. The yield of copolymer was 19.5 g, produced at a rate of 5 kg of copolymer/g Pd/hr. The copolymer has an LVN of 0.5 dl/g.

COMPARATIVE EXAMPLE II

A carbon monoxide/ethylene copolymer was produced by a procedure substantially similar to that of Comparative Example I except that 0.04 mmol of trifluoroacetic acid was provided instead of 0.02 mmol. The yield of polymer was 22.3 g, produced at the rate of 7 kg of copolymer/g Pd hr. The LVN of the product was 0.8 dl/g.

COMPARATIVE EXAMPLE III

A copolymer of carbon monoxide and ethylene was produced by a procedure substantially similar to that of Comparative Example I except that the catalyst composition solution comprised 23.5 ml methanol, 1.5 ml toluene, 0.0055 mmol palladium acetate, 0.055 mmol trifluoroacetic acid and 0.0066 mmol 1,3-bis[di(2-methoxyphenyl)phosphino]propane, and the time of reaction was 2 hours instead of 3 hours. The yield of copolymer was 18.6 g, produced at the rate of 16 kg of copolymer/g Pd hr. The product has an LVN of 1.0 dl/g.

COMPARATIVE EXAMPLE IV

A carbon monoxide/ethylene copolymer was produced by a procedure substantially similar to that of Comparative Example III except that the catalyst composition solution contained 0.11 mmol trifluoroacetic acid instead of 0.055 mmol. The yield of copolymer was 19.8 g, produced at the rate of 17 kg of copolymer/g Pd hr. The product had an LVN of 1.0 dl/g.

COMPARATIVE EXAMPLE V

A copolymer of carbon monoxide and ethylene was produced by a procedure substantially similar to that of Comparative Example III except that the catalyst composition solution contained 0.165 mmol trifluoroacetic acid instead of 0.055 mmol. The yield of copolymer was 17.5 g, produced at a rate of 15 kg of copolymer/g Pd hr. The product had an LVN of 0.9 dl/g.

COMPARATIVE EXAMPLE VI

A carbon monoxide/ethylene copolymer was produced by a procedure substantially similar to that of Comparative Example III except that 0.33 mmol of trifluoroacetic acid was present instead of 0.055 mmol. The yield of polymer was 18.7 g, produced at a rate of 16 kg of polymer/g Pd hr. The product had an LVN of 1.0 dl/g.

COMPARATIVE EXAMPLE VII

A terpolymer of carbon monoxide, ethylene and propylene was produced by charging 125 ml of methanol to an autoclave of 300 ml capacity equipped with a mechanical stirrer. After the autoclave and contents were heated to 65° C., ethylene was added to give an ethylene partial pressure of 21 bar, propylene to give a propylene partial pressure of 15 bar and carbon monoxide to give a carbon monoxide partial pressure of 20 bar. A catalyst composition solution was then added which comprised 25 ml methanol, 0.01 mmol palladium acetate, 0.02 mmol trifluoroacetic acid and 0.012 mmol 1,3-bis[di(2-methoxyphenyl)phosphino]propane.

The pressure in the autoclave was maintained relatively constant by continuing addition of an equimolar mixture of carbon monoxide and ethylene. After 10 hours the polymerization was terminated by cooling the autoclave and contents to room temperature and releasing the pressure. The terpolymer product was recovered by filtration, washed with methanol and then dried. The yield of terpolymer was 10 g, obtained at the rate of 0.9 kg terpolymer/g Pd hr. The terpolymer had an LVN of 0.4 dl/g.

COMPARATIVE EXAMPLE VIII

A terpolymer of carbon monoxide, ethylene and propylene was produced by a procedure substantially similar to that of Comparative Example VII except that the catalyst composition solution contained 0.2 mmol trifluoroacetic acid instead of 0.02 mmol. The yield of terpolymer was 18.0 g, obtained at the rate of 1.7 kg of terpolymer/g Pd hr. The terpolymer had an LVN of 0.6 dl/g.

COMPARATIVE EXAMPLES IX AND X

Illustrative Embodiments I and II

In these Comparative Examples and Illustrative Embodiments, a terpolymer of carbon monoxide, ethylene and propylene was produced by a continuous process employing a catalyst composition solution having proportions of 1 g acetone, 1.1 g palladium acetate, 2.74 g 1,3-bis[di(2-methoxyphenyl)phosphino]propane and a varying quantity of trifluoroacetic acid. The volume of the reactor was 1 liter, the reaction temperature was 80° C. and the total pressure was 45 bar. Methanol was provided to the reactor at the rate of 5.75 kg/hr, propylene at 0.5 kg/hr and catalyst solution at 22 ml/hr. The weight of suspension in the reactor was 83 kg. The results are given in Table I.

TABLE I

| Run No. | Comparative Example IX | Comparative Example X | Illustrative Embodiment I | Illustrative Embodiment II |
| --- | --- | --- | --- | --- |
| Trifluoroacetic Cat. Comp. Solution, g/l | 11.2 | 5.60 | 2.24 | 1.12 |
| Trifluoroacetic Acid/Palladium molar ratio | 20/1 | 10/1 | 4/1 | 2/1 |
| Feed Rates. | | | | |
| CO, Nl/hr | 500 | 525 | 600 | 625 |
| C$_2$H$_4$, Nl/hr | 850 | 875 | 925 | 950 |
| Polymer Production Rate, kg/hr | 0.61 | 0.65 | 0.83 | 0.92 |
| Polymerization Rate kg/g Pd hr | 4.5 | 4.9 | 6.3 | 7.1 |
| LVN of Product | 1.8 | 1.8 | 1.8 | 1.8 |

COMPARATIVE EXAMPLE XI

Illustrative Embodiment III

In these two experiments, carbon monoxide/ethylene/propylene terpolymers were produced by a continuous process in two reactors connected in series, the reaction product of the first reactor and unreacted feed components being fed continuously to the second reactor. The pressure in the two reactors was maintained relatively constant by discharging the excess feed gases from the second reactor and the two reactors had substantially the same gas phase composition. The same catalyst solutions as those used in Comparative Example X and Illustrative Embodiment II were used for Comparative Example XI and Illustrative Embodiment III, respectively. In each first reactor the reactor volume was 13.6 liters, the reaction temperature was 80° C. and the reactor pressure was 45 bar. The methanol feed was 5.75 kg/hr, the propylene feed was 0.73 kg/hr and the feed of catalyst composition solution was 23 ml/hr. The quantity of the suspension was 7.3 g. In each second reactor, the reactor volume was 150 liters and the reaction temperature and pressure were 80° C. and 45 bar. The weight of suspension was 83 kg. The results are shown in Table II.

TABLE II

| Run No. | Comparative Example XV | | Illustrative Embodiment III | |
| --- | --- | --- | --- | --- |
| | Reactor 1 | Reactor 2 | Reactor 1 | Reactor 2 |
| Trifluoroacetic acid/Palladium molar ratio | 10/1 | 10/1 | 2/1 | 2/1 |
| Feed Rates | | | | |
| CO, Nl/hr | 250 | 270 | 275 | 300 |
| C$_2$H$_4$, Nl/hr | 375 | 525 | 400 | 550 |
| Polymer Production Rate, kg/hr | 0.9 | 1.0 | 1.0 | 1.12 |
| Polymerization Rate, kg/g Pd hr | 7.5 | 7.5 | 8.2 | 8.3 |
| LVN of Final Product | — | 2.0 | — | 2.0 |

What is claimed is:

1. In the continuous process of producing a linear alternating polymer of carbon monoxide and at least one ethylenically unsaturated hydrocarbon by contacting the carbon monoxide and ethylenically unsaturated hydrocarbon under polymerization conditions in the presence of a reaction diluent and a catalyst composition formed from a compound of palladium, a non-hydrohalogenic acid having a pKa below 2 and a bidentate ligand of phosphorus, the improvement wherein the catalyst composition comprises a molar ratio of the non-hydrohalogenic acid to palladium compound below 6.

2. The process of claim 1 wherein the molar ratio is from about 0.5 mole to about 5 moles of non-hydrohalogenic acid per mole of palladium compound.

3. The process of claim 1 wherein the molar ratio is from about 1 mole to about 4 moles of non-hydrohalogenic acid per mole of palladium compound.

4. In the continuous process of producing a linear alternating copolymer of carbon monoxide and ethylene by contacting the carbon monoxide and ethylene under polymerization conditions in the presence of a reaction diluent and a catalyst composition formed from a compound of palladium, a non-hydrohalogenic acid having a pKa below 2 and a bidentate ligand of phosphorus, the improvement wherein the catalyst composition comprises a molar ratio of the non-hydrohalogenic acid to palladium compound of from about 0.5 to about 5.

5. The process of claim 4 wherein the molar ratio is from about 1 to about 4.

6. In the continuous process of producing a linear alternating terpolymer of carbon monoxide, ethylene and propylene by contacting the carbon monoxide, ethylene and propylene under polymerization conditions in the presence of a reaction diluent and a catalyst composition formed from a compound of palladium, a non-hydrohalogenic acid having a pKa below 2 and a bidentate ligand of phosphorus, the improvement wherein the catalyst composition comprises a molar ratio of the non-hydrohalogenic acid to palladium compound of from about 0.5 to about 5.

7. The process of claim 6 wherein the molar ratio is from about 1 to about 4.

* * * * *